United States Patent [19]
Ottaway

[11] Patent Number: 6,053,516
[45] Date of Patent: Apr. 25, 2000

[54] BUCKET DOLLY

[76] Inventor: Harold J. Ottaway, 113 E. 9270 South, Sandy, Utah 84070

[21] Appl. No.: 08/970,002

[22] Filed: Nov. 13, 1997

[51] Int. Cl.[7] ........................................................ B62B 1/26
[52] U.S. Cl. ..................... 280/79.5; 280/47.27; 280/645; 280/47.24
[58] Field of Search ......................... 280/79.5, 35, 47.27, 280/645, 47.24, 47.28; D34/15

[56] References Cited

U.S. PATENT DOCUMENTS

| | | | |
|---|---|---|---|
| 618,629 | 1/1899 | Watts et al. ............................. | 414/456 |
| 2,044,363 | 6/1936 | Morse ....................................... | 280/53 |
| 3,845,968 | 11/1974 | Larson ..................................... | 280/654 |
| 4,458,914 | 7/1984 | Holtz ....................................... | 280/654 |
| 5,088,751 | 2/1992 | Zint ........................................ | 280/47.34 |
| 5,380,033 | 1/1995 | Harling .................................... | 280/654 |
| 5,860,659 | 1/1999 | Hart ........................................ | 280/79.5 |

*Primary Examiner*—J. J. Swann
*Assistant Examiner*—James S. McClellan

[57] ABSTRACT

A bucket transporter is provided including a dolly frame with a central base and at least one axle coupled to the base and extending outwardly therefrom and a pair of wheels rotatably coupled to ends of the axle. Further included is a dolly post coupled to the central base and extending upwardly therefrom. A bottom support including a circular ring is pivotally coupled to the central base of the dolly frame such that the bottom support is adapted to only swivel between a lowered orientation with the circular ring situated within a horizontal plane and a raised orientation with the circular ring situated within a vertical plane.

1 Claim, 2 Drawing Sheets

BUCKET DOLLY

BACKGROUND OF THE INVENTION

1. Field of the Invention

The present invention relates to dollies and more particularly pertains to a new bucket dolly for transporting a bucket, pail or the like.

2. Description of the Prior Art

The use of dollies is known in the prior art. More specifically, dollies heretofore devised and utilized are known to consist basically of familiar, expected and obvious structural configurations, notwithstanding the myriad of designs encompassed by the crowded prior art which have been developed for the fulfillment of countless objectives and requirements.

Known prior art dollies include U.S. Pat. No. 4,106,648; U.S. Pat. No. 4,981,412; U.S. Pat. No. Des. 335,567; U.S. Pat. No. 3,941,399; U.S. Pat. No. 4,936,598; and U.S. Pat. No. 5,029,883.

In these respects, the bucket dolly according to the present invention substantially departs from the conventional concepts and designs of the prior art, and in so doing provides an apparatus primarily developed for the purpose of transporting a bucket, pail or the like.

SUMMARY OF THE INVENTION

In view of the foregoing disadvantages inherent in the known types of dollies now present in the prior art, the present invention provides a new bucket dolly construction wherein the same can be utilized for transporting a bucket, pail or the like.

The general purpose of the present invention, which will be described subsequently in greater detail, is to provide a new bucket dolly apparatus and method which has many of the advantages of the dollies mentioned heretofore and many novel features that result in a new bucket dolly which is not anticipated, rendered obvious, suggested, or even implied by any of the prior art dollies, either alone or in any combination thereof.

To attain this, the present invention generally comprises a bucket having a circular bottom face with a cylindrical periphery couple thereto and extending upwardly therefrom. By this structure, an interior space and an opening having a peripheral lip are defined. As best shown in FIG. 2, a dolly frame is provided including a central base with a top face, a bottom face, a front face, a rear face, and a pair of side faces formed therebetween. The top face has a pair of slots formed therein adjacent the side faces of the base. A circular bore is formed in a central extent of the base about a vertical axis. The bottom face has an arcuate front extent for allowing the forward movement of the base over rough terrain, as will become apparent. The dolly frame further includes a pair of axles coupled to the side faces of the base. Such axles extend outwardly from the base in coaxial relationship. A pair of wheels are rotatably coupled to ends of the axles. Next provided is a dolly post, as shown in FIG. 1. The dolly post has a linear lower extent that has a length over ¾ that of the total length of the post. The post further has a linear upper extent forming an obtuse angle of about 120 degrees with the lower extent. The upper extent has an elastomeric handle grip formed at an upper end thereof. A bottom end of the lower extent of the dolly post is removably coupled within the circular bore of the base of the dolly frame. With reference again to FIG. 2 in particular, a bottom bucket support is included which is defined by a circular ring. Coupled to the circular ring and extending upwardly therefrom is a peripheral lip. At least one support strip is coupled between diametrically opposed points along the circular ring. The peripheral lip of the bottom support has a pair of spaced and parallel arms coupled thereto. These arms extend rearwardly from the lip for pivotally coupling to the base of the dolly frame within the slots thereof. By this arrangement, the bottom bucket support is adapted to only swivel between a lowered orientation with the circular ring situated within a horizontal plane and a raised orientation with the circular ring situated within a vertical plane. As shown in FIGS. 1 & 3, an upper bucket support is provided including a plate having a rectangular configuration. A circular bore is formed in the plate between a top face and a bottom face thereof for slidably receiving the lower extent of the dolly post. A threaded aperture is formed in an end of the plate adjacent the bore for threadedly receiving a wing nut. Such nut serves to engage the dolly post for maintaining the upper bucket support at a fixed elevation. An end of the plate opposite the circular bore has a pair of spaced prongs integrally coupled thereto and extending downwardly therefrom.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new bucket dolly apparatus and method which has many of the advantages of the dollies mentioned heretofore and many novel features that result in a new bucket dolly which is not anticipated, rendered obvious, suggested, or even implied by any of the prior art dollies, either alone or in any combination thereof.

It is another object of the present invention to provide a new bucket dolly which may be easily and efficiently manufactured and marketed.

It is a further object of the present invention to provide a new bucket dolly which is of a durable and reliable construction.

An even further object of the present invention is to provide a new bucket dolly which is susceptible of a low cost of manufacture with regard to both materials and labor, and which accordingly is then susceptible of low prices of sale to the consuming public, thereby making such bucket dolly economically available to the buying public.

Still yet another object of the present invention is to provide a new bucket dolly which provides in the apparatuses and methods of the prior art some of the advantages thereof, while simultaneously overcoming some of the disadvantages normally associated therewith.

Still another object of the present invention is to provide a new bucket dolly for transporting a bucket, pail or the like.

Even still another object of the present invention is to provide a new bucket dolly that includes a dolly frame with a central base and at least one axle coupled to the base and extending outwardly therefrom and a pair of wheels rotatably coupled to ends of the axle. Further included is a dolly post coupled to the central base and extending upwardly therefrom. A bottom support including a circular ring is pivotally coupled to the central base of the dolly frame such that the bottom support is adapted to only swivel between a lowered orientation with the circular ring situated within a horizontal plane and a raised orientation with the circular ring situated within a vertical plane.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
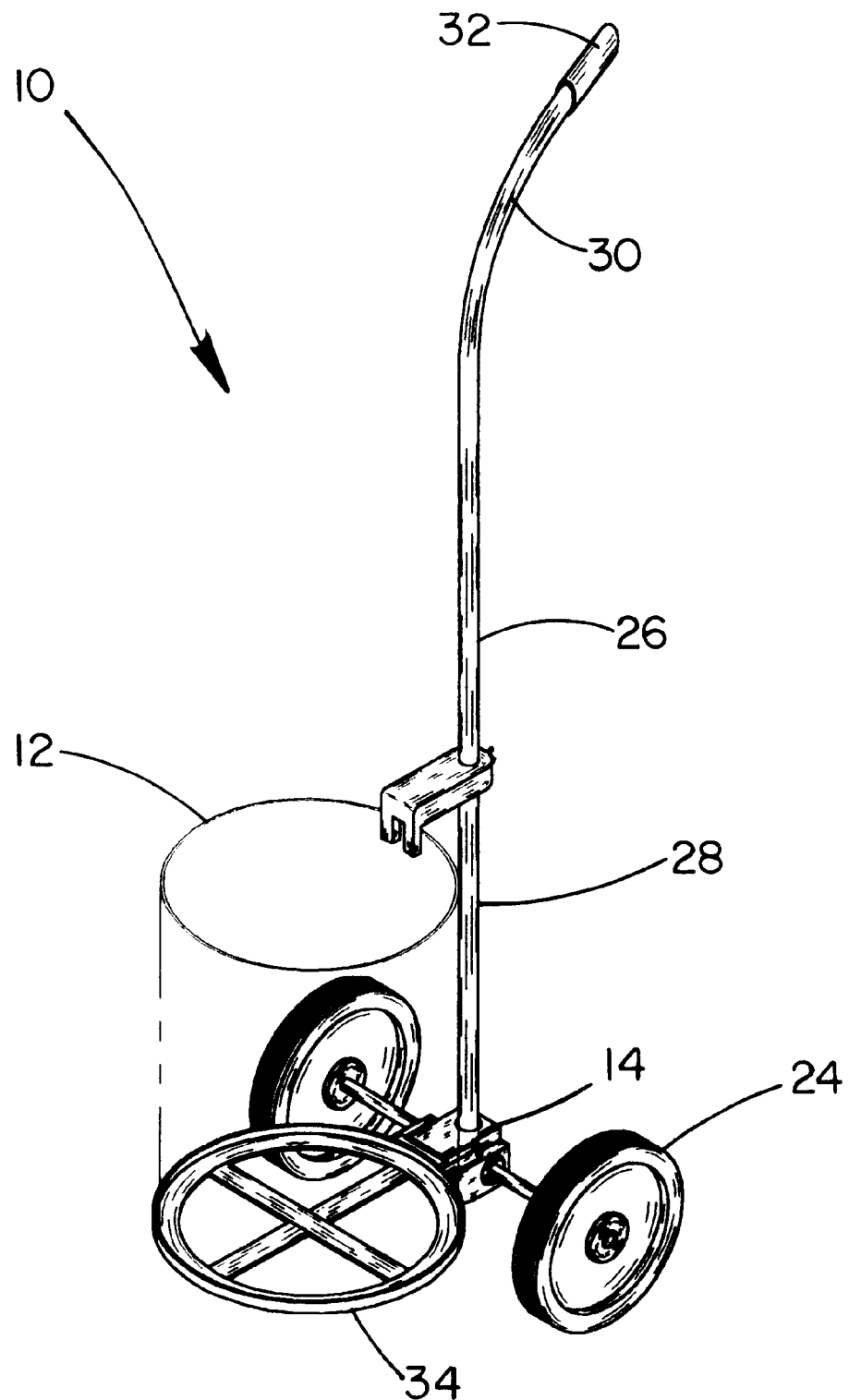
FIG. 1 is a perspective view of a new bucket dolly according to the present invention.
Figure 2:
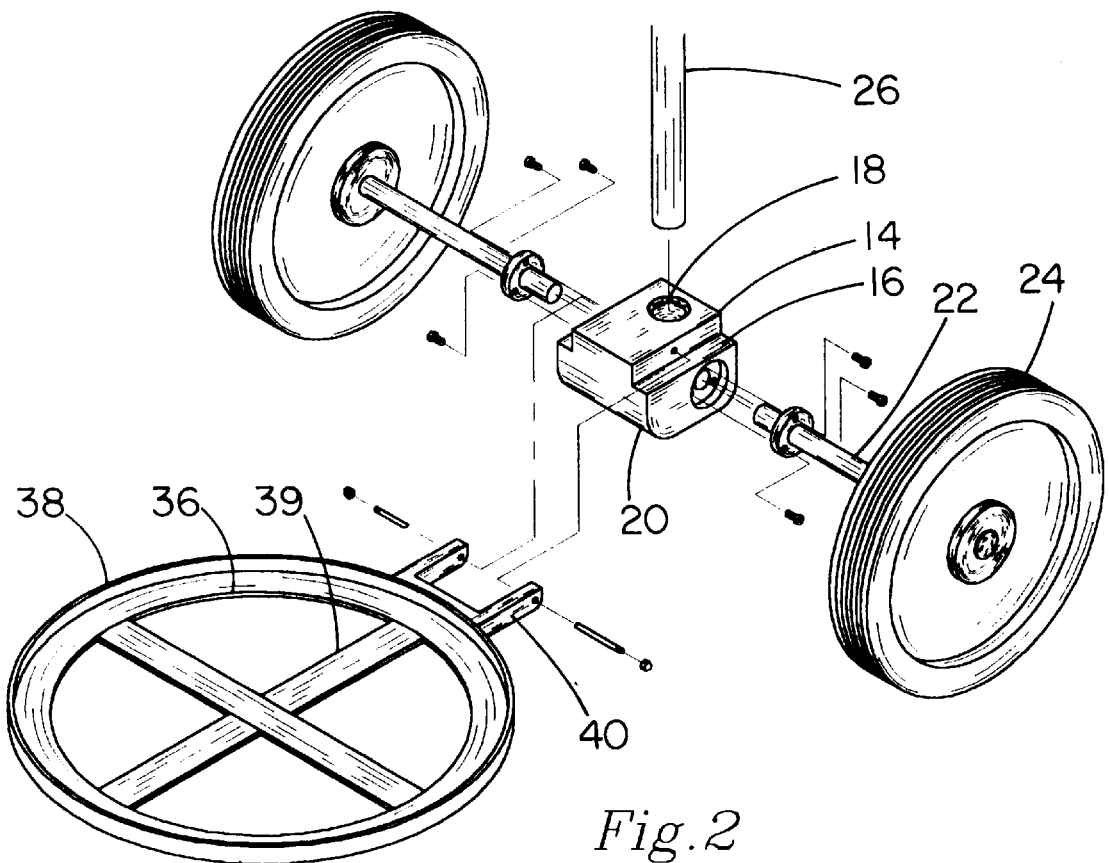
FIG. 2 is an exploded view of the present invention.
Figure 3:
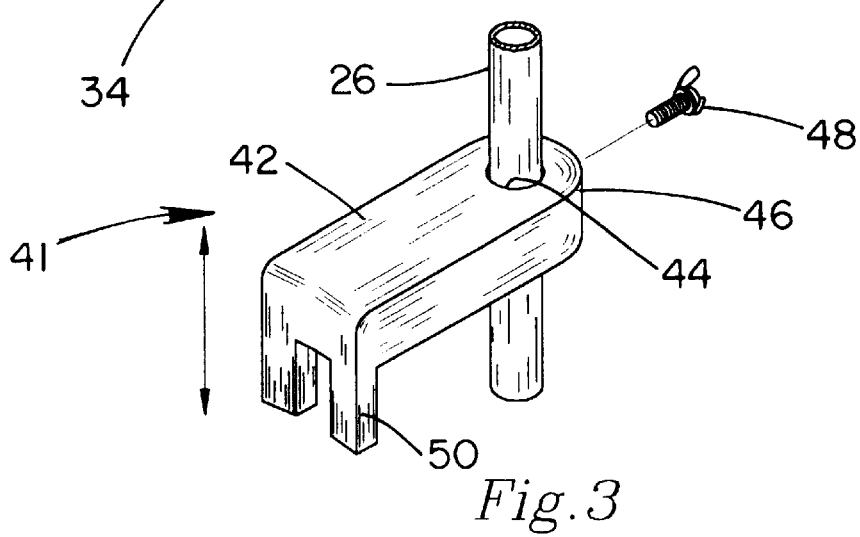
FIG. 3 is a close-up view of the upper bucket support of the present invention.

With reference now to the drawings, and in particular to FIGS. 1 through 3 thereof, a new bucket dolly embodying the principles and concepts of the present invention and generally designated by the reference numeral 10 will be described.

The present invention, as designated as numeral 10, is adapted for use with a 5-gallon bucket 12 having a circular bottom face with a cylindrical periphery couple thereto and extending upwardly therefrom. By this structure, an interior space and an opening having a peripheral lip are defined. In the alternative, the bucket may be replaced with a pail or drum for carrying various items.

As best shown in FIG. 2, a dolly frame 14 is provided including a central base with a top face, a bottom face, a front face, a rear face, and a pair of side faces formed therebetween. The dolly frame and remaining components of the present invention are preferably constructed from plastic. The top face has a pair of rectilinear slots 16 formed therein adjacent the side faces of the base. A circular bore 18 is formed in a central extent of the base about a vertical axis. The bottom face has an arcuate front extent 20 for allowing the forward movement of the base over rough terrain, as will become apparent.

The dolly frame further includes a pair of axles 22 coupled to the side faces of the base. Such axles extend outwardly from the base in coaxial relationship. A pair of wheels 24 are rotatably coupled to ends of the axles. Such wheels are ideally 4 inches in diameter.

Next provided is a dolly post 26, as shown in FIG. 1. The height of the dolly post is preferably 40 inches. The dolly post has a linear lower extent 28 that has a length over ¾ that of the total length of the post. The post further has a linear upper extent 30 forming an obtuse angle of about 120 degrees with the lower extent. The upper extent has an elastomeric handle grip 32 formed at an upper end thereof. A bottom end of the lower extent of the dolly post is removably coupled within the circular bore of the base of the dolly frame.

With reference again to FIG. 2 in particular, a bottom bucket support 34 is included which is defined by a circular ring 36. Coupled to the circular ring and extending upwardly therefrom is a peripheral lip 38. At least one support strip 39 is coupled between diametrically opposed points along the circular ring. The peripheral lip of the bottom support has a pair of spaced and parallel arms 40 coupled thereto. These arms extend rearwardly from the lip for pivotally coupling to the base of the dolly frame within the slots thereof. The coupling of the arms within the slots is preferably accomplished at a midpoint of the slots. By this arrangement, the bottom bucket support is adapted to only swivel between a lowered orientation with the circular ring situated within a horizontal plane and a raised orientation with the circular ring situated within a vertical plane.

As shown in FIGS. 1 & 3, an upper bucket support 41 is provided including a plate 42 having a rectangular configuration. A circular bore 44 is formed in the plate between a top face and a bottom face thereof for slidably receiving the lower extent of the dolly post. A threaded aperture 46 is formed in an end of the plate adjacent the bore for threadedly receiving a wing nut 48. Such nut serves to engage the dolly post for maintaining the upper bucket support at a fixed elevation. An end of the plate opposite the circular bore has a pair of spaced prongs 50 integrally coupled thereto and extending downwardly therefrom.

In use, the bucket may be situated on the bottom bucket support when in the lowered orientation. The upper bucket support may be lowered such that the prongs engage the peripheral lip of the bucket. When the upper support is engaged with the bucket, the upper bucket support is fixed via the wing nut thereby allowing the transporting of the bucket. It should be noted that the prongs may also be employed to engage a lip associated with a lid of a pail or the like.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bucket transporter comprising, in combination:

a bucket having a circular bottom face with a cylindrical periphery coupled thereto and extending upwardly therefrom thus defining an interior space and an opening having a peripheral lip;

a dolly frame including a central base with a top face, a bottom face, a front face, a rear face, and a pair of side faces formed therebetween, the top face having a pair of slots formed therein adjacent the side faces of the base and a circular bore formed in a central extent thereof about a vertical axis, the bottom face having an arcuate front extent, the dolly frame further including a pair of axles coupled to the side faces of the base and extending outwardly therefrom in coaxial relationship and a pair of wheels rotatably coupled to ends of the axles;

a dolly post having a linear lower extent that has a length over ¾ that of the total length of the post and a linear upper extent forming an obtuse angle of about 120 degrees with the lower extent, the upper extent having an elastomeric handle grip formed at an upper end thereof, wherein a bottom end of the lower extent of the dolly post is removably coupled within the circular bore of the base of the dolly frame;

a bottom bucket support including a circular ring with a peripheral lip coupled thereto and extending upwardly therefrom, at least one support strip coupled between diametrically opposed points along the circular ring, the peripheral lip of the bottom support having a pair of spaced and parallel arms coupled thereto and extending rearwardly therefrom for pivotally coupling to the base of the dolly frame within the slots thereof, whereby the bottom bucket support is adapted to only swivel between a lowered orientation with the circular ring situated within a horizontal plane and a raised orientation with the circular ring situated within a vertical plane; and an upper bucket support including a plate having a rectangular configuration with a circular bore formed therein between a top face and a bottom face thereof for slidably receiving the lower extent of the dolly post and a threaded aperture formed in an end of the plate adjacent the bore for threadedly receiving a wing nut which may engage the dolly post for maintaining the upper bucket support at a fixed elevation, an end of the plate opposite the circular bore having a pair of prongs integrally coupled thereto and extending downwardly therefrom;

whereby the bucket may be situated on the bottom bucket support when in the lowered orientation and the upper bucket support may be lowered such that the prongs engage the peripheral lip of the bucket whereafter the upper bucket support is fixed via the wing nut thereby allowing the transporting of the bucket.

* * * * *